US012654715B2

(12) United States Patent (10) Patent No.: US 12,654,715 B2
Ueno et al. (45) Date of Patent: Jun. 16, 2026

(54) INFORMATION PROCESSING DEVICE FOR VEHICLE, AND INFORMATION PROCESSING SYSTEM

(71) Applicants: TOYOTA JIDOSHA KABUSHIKI KAISHA, Toyota (JP); ADVICS CO., LTD., Kariya (JP)

(72) Inventors: Hiroshi Ueno, Toyota (JP); Wataru Kanda, Nisshin (JP); Takeshi Takemoto, Nagoya (JP); Hideyuki Takaki, Okazaki (JP); Yoshihisa Yamada, Nagoya (JP); Tomoya Tanaka, Kariya (JP); Yasufumi Enami, Kariya (JP)

(73) Assignees: TOYOTA JIDOSHA KABUSHIKI KAISHA, Toyota (JP); ADVICS CO., LTD., Kariya (JP)

( * ) Notice: Subject to any disclaimer, the term of this patent is extended or adjusted under 35 U.S.C. 154(b) by 154 days.

(21) Appl. No.: 18/630,035

(22) Filed: Apr. 9, 2024

(65) Prior Publication Data

US 2024/0395139 A1 Nov. 28, 2024

(30) Foreign Application Priority Data

May 26, 2023 (JP) ................................. 2023-087043

(51) Int. Cl.
*B60W 40/10* (2012.01)
*B60W 40/064* (2012.01)
(Continued)

(52) U.S. Cl.
CPC ...... *B60W 40/1005* (2013.01); *B60W 40/064* (2013.01); *B60W 40/076* (2013.01);
(Continued)

(58) Field of Classification Search
CPC ........... B60W 40/1005; B60W 40/064; B60W 40/076; B60W 2556/45; G07C 5/008; G08G 1/0967
See application file for complete search history.

(56) References Cited

U.S. PATENT DOCUMENTS

| | | | | |
|---|---|---|---|---|
| 5,925,087 A | * | 7/1999 | Ohnishi | .............. F16H 61/0213 |
| | | | | 701/1 |
| 2005/0021222 A1 | * | 1/2005 | Minami | ............... G07C 5/0858 |
| | | | | 701/1 |

(Continued)

FOREIGN PATENT DOCUMENTS

| | | | | |
|---|---|---|---|---|
| CN | 111311782 A | * | 6/2020 | ........... G07C 5/0808 |
| EP | 3124303 A2 | * | 2/2017 | ........... B60W 10/06 |

(Continued)

OTHER PUBLICATIONS

Translation of WO-2019073007-A1, 8 pages (Year: 2019).*
Translation of CN-111311782-A, 16 pages (Year: 2020).*
Translation of KR-101713734-B1, 20 pages (Year: 2017).*

*Primary Examiner* — Dale W Hilgendorf
(74) *Attorney, Agent, or Firm* — Oliff PLC

(57) ABSTRACT

An information processing device for a vehicle, the information processing device including one or more processors configured to execute acquiring vehicle driving force, acquiring inertial resistance with respect to motion of the vehicle, acquiring position coordinates of a point where the vehicle is situated, acquiring gradient resistance at the point where the vehicle is situated, calculating traveling resistance by subtracting the inertial resistance and the gradient resistance from the vehicle driving force, and externally transmitting, from the vehicle, data including the positional coordinates, and the traveling resistance calculated based on (Continued)

the vehicle driving force at the positional coordinates, the inertial resistance, and the gradient resistance, as collected data.

5 Claims, 3 Drawing Sheets

(51) Int. Cl.
| | | |
|---|---|---|
| *B60W 40/076* | (2012.01) | |
| *G07C 5/00* | (2006.01) | |
| *G08G 1/0967* | (2006.01) | |

(52) U.S. Cl.
CPC ........... *G07C 5/008* (2013.01); *G08G 1/0967* (2013.01); *B60W 2556/45* (2020.02)

(56) References Cited

U.S. PATENT DOCUMENTS

| | | | | |
|---|---|---|---|---|
| 2014/0236457 | A1* | 8/2014 | Chen | B60W 30/188 |
| | | | | 701/110 |
| 2015/0212107 | A1* | 7/2015 | Sannodo | B60W 40/107 |
| | | | | 702/141 |

| | | | | |
|---|---|---|---|---|
| 2016/0016564 | A1* | 1/2016 | Otake | G08G 1/0112 |
| | | | | 701/75 |
| 2019/0100207 | A1* | 4/2019 | Maruyama | B60W 10/107 |
| 2021/0031775 | A1* | 2/2021 | Noma | B60W 40/06 |
| 2021/0046937 | A1* | 2/2021 | Hattori | G08G 1/0112 |
| 2021/0046938 | A1* | 2/2021 | Hattori | G06N 20/00 |
| 2021/0124088 | A1* | 4/2021 | Hattori | G01C 21/3461 |
| 2022/0203957 | A1* | 6/2022 | Yanase | B60W 10/02 |
| 2022/0281457 | A1* | 9/2022 | Usui | B60W 40/1005 |
| 2023/0311910 | A1* | 10/2023 | Naga | B60W 40/02 |
| | | | | 701/1 |
| 2023/0339487 | A1* | 10/2023 | Okuda | B60W 40/08 |
| 2024/0175679 | A1* | 5/2024 | Tokuda | G01B 21/08 |

FOREIGN PATENT DOCUMENTS

| | | | | | |
|---|---|---|---|---|---|
| JP | 2016-149015 | A | | 8/2016 | |
| JP | 2021-033312 | A | | 3/2021 | |
| JP | 2021-068242 | A | | 4/2021 | |
| KR | 101713734 | B1 * | 3/2017 | ........ | B60W 50/0097 |
| WO | WO-2019073007 | A1 * | 4/2019 | ........ | B60W 40/1005 |

* cited by examiner

INFORMATION PROCESSING DEVICE FOR VEHICLE, AND INFORMATION PROCESSING SYSTEM

CROSS-REFERENCE TO RELATED APPLICATION

This application claims priority to Japanese Patent Application No. 2023-087043 filed on May 26, 2023, incorporated herein by reference in its entirety.

BACKGROUND

1. Technical Field

The present disclosure relates to an information processing device for a vehicle and an information processing system.

2. Description of Related Art

An information processing system disclosed in Japanese Unexamined Patent Application Publication No. 2016-149015 (JP 2016-149015 A) includes a vehicle and an information center. The vehicle includes an information processing device and a camera. The information processing device acquires road information from the information center, and thereby comprehends flooded points at which roads are flooded. Also, the information processing device shoots images of the flooded points, using the camera, when the vehicle travels over the flooded points. Further, the information processing device estimates a degree of flooding at the flooded points based on the images that are shot. The information processing device then transmits position information of the flooded points at which the vehicle has traveled, and the degree of flooding estimated at the flooded points, to the information center.

SUMMARY

In an information processing system such as that in JP 2016-149015 A, it is essential that the vehicle be equipped with the camera for shooting images of flooded points. Also, even if the vehicle is equipped with the camera, the camera may not necessarily be set to an angle of view that enables shooting images of flooded points, or have sufficient performance to estimate the degree of flooding. Accordingly, the information processing system such as that in JP 2016-149015 A requires a dedicated camera, requires a high-performance camera, or the like. Note that while an example of flooded roads has been described here, similar problems arise when determining or estimating some kind of abnormality on a road.

An information processing device for a vehicle according to the present disclosure includes one or more processors. The processors are configured to execute acquiring vehicle driving force that is driving force of the vehicle, acquiring inertial resistance that is an apparent resistance force with respect to motion of the vehicle, acquiring position coordinates of a point at which the vehicle is situated, acquiring gradient resistance that is a resistance force due to a gradient at the point at which the vehicle is situated, calculating traveling resistance that is a value obtained by subtracting the inertial resistance and the gradient resistance from the vehicle driving force, and externally transmitting, from the vehicle, data including the positional coordinates, and the traveling resistance calculated based on the vehicle driving force at the positional coordinates, the inertial resistance at the positional coordinates, and the gradient resistance at the positional coordinates, as collected data.

The processors may be further configured to execute acquiring a vehicle speed that is a speed of the vehicle. The collected data may include the vehicle speed at the position coordinates.

The processors may be further configured to execute acquiring a steering angle that is an angular position of a steering wheel of the vehicle. The collected data may include the steering angle at the position coordinates.

An information processing system according to the present disclosure includes an information processing device installed in a vehicle, and a server configured to perform wireless communication with the information processing device. The information processing device is configured to execute acquiring vehicle driving force that is driving force of the vehicle, acquiring inertial resistance that is an apparent resistance force with respect to motion of the vehicle, acquiring position coordinates of a point at which the vehicle is situated, acquiring gradient resistance that is a resistance force due to a gradient at the point at which the vehicle is situated, calculating traveling resistance that is a value obtained by subtracting the inertial resistance and the gradient resistance from the vehicle driving force, and externally transmitting, from the vehicle, data including the positional coordinates, and the traveling resistance calculated based on the vehicle driving force at the positional coordinates, the inertial resistance at the positional coordinates, and the gradient resistance at the positional coordinates, as collected data. The server is configured to execute acquiring the collected data, and determining whether an abnormality is present on a road at the position coordinates included in the collected data, based on the traveling resistance included in the collected data.

The information processing device may be configured to further execute acquiring a vehicle speed that is a speed of the vehicle, and acquiring a steering angle that is an angular position of a steering wheel of the vehicle. The collected data may include the vehicle speed at the position coordinates and the steering angle at the position coordinates. The server may be configured to execute identifying that an abnormality is present on the road at the position coordinates included in the collected data, and that a type of the abnormality is flooding, under a condition that an amount of increase in the traveling resistance included in the collected data is no less than a stipulated resistance value, and also the vehicle speed included in the collected data is no higher than a stipulated vehicle speed.

The information processing device may be configured to further execute acquiring a vehicle speed that is a speed of the vehicle, and acquiring a steering angle that is an angular position of a steering wheel of the vehicle. The collected data may include the vehicle speed at the position coordinates and the steering angle at the position coordinates. The server may be configured to execute identifying that an abnormality is present on the road at the position coordinates included in the collected data, and that the type of the abnormality is sidewind, under a condition that the amount of increase in the traveling resistance included in the collected data is no less than a stipulated resistance value, the vehicle speed included in the collected data is higher than a stipulated vehicle speed, and also an amount of variation in the steering angle that is included in the collected data is no less than a stipulated steering angle.

The information processing device may be configured to further execute acquiring the vehicle speed that is a speed of the vehicle, and acquiring rotational speed of each of a plurality of wheels that the vehicle is equipped with. The collected data may include the vehicle speed at the position coordinates and the rotational speed of each of the wheels at the position coordinates. The server may be configured to further execute identifying that an abnormality is present on the road at the position coordinates included in the collected data, and that a type of the abnormality is becoming stuck due to snow, under a condition that an amount of increase in the traveling resistance included in the collected data is no less than a stipulated resistance value, and also an absolute value of difference between a maximum value and a minimum value of the rotational speed of each wheel included in the collected data is no less than a stipulated difference.

The server may be configured to further execute distributing road information including position coordinates at which determination is made that an abnormality is present on the road, to one or more of the vehicles, under a condition that determination is made that an abnormality is present on the road.

The road information may be distributed to vehicles situated within a stipulated distance from the position coordinates included in the road information.

According to the above configuration, the traveling resistance is transmitted as collected data, along with the position coordinates, and accordingly data for determining or estimating abnormalities on the road, such as flooding, can be obtained.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Schematic Configuration of Information Processing System

An embodiment of the present disclosure will be described below with reference to FIGS. 1 to 3. First, a schematic configuration of an information processing system IS will be described.

Figure 1:
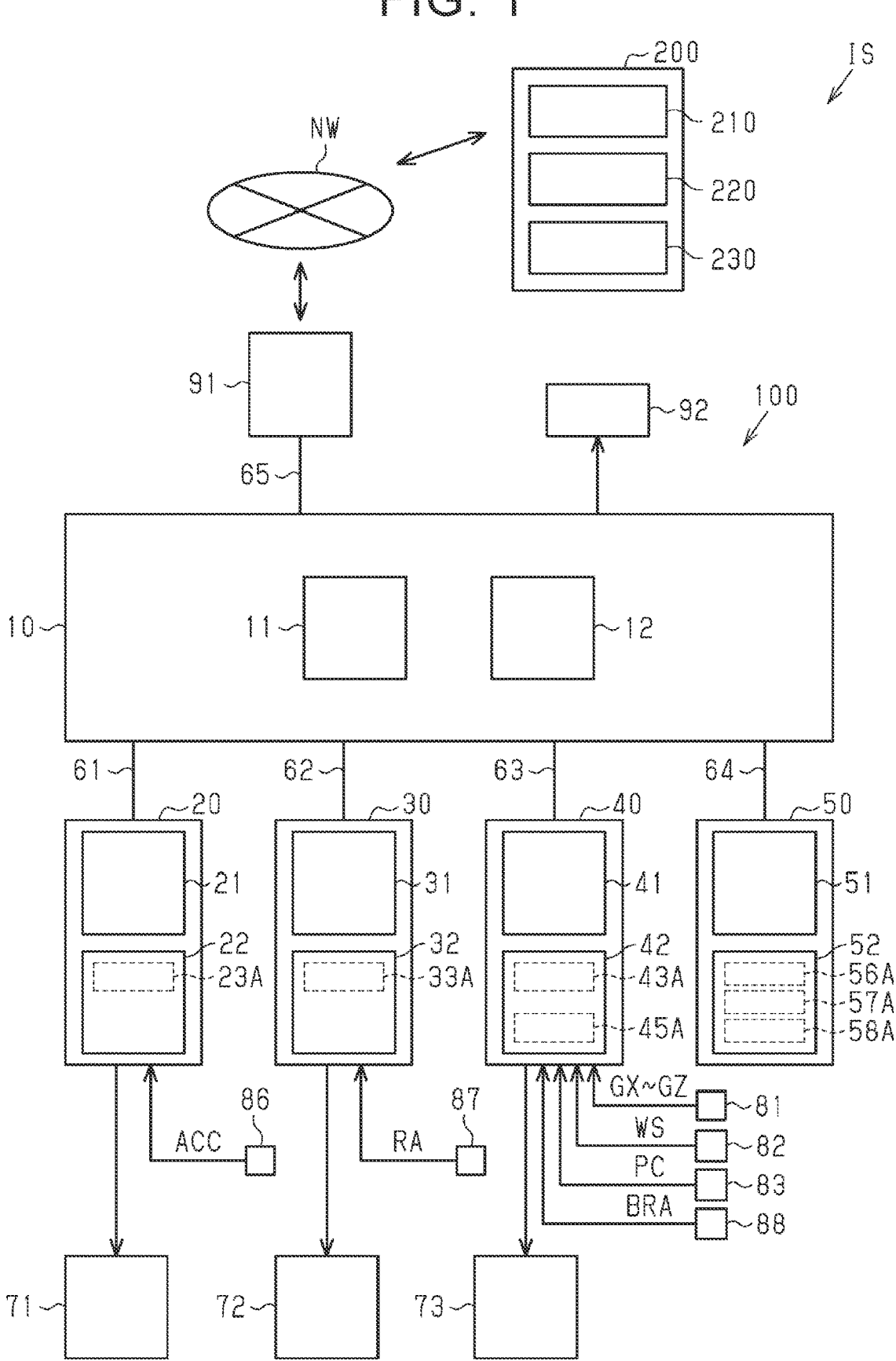
FIG. 1 is a schematic configuration diagram of an information processing system.
Figure 2:
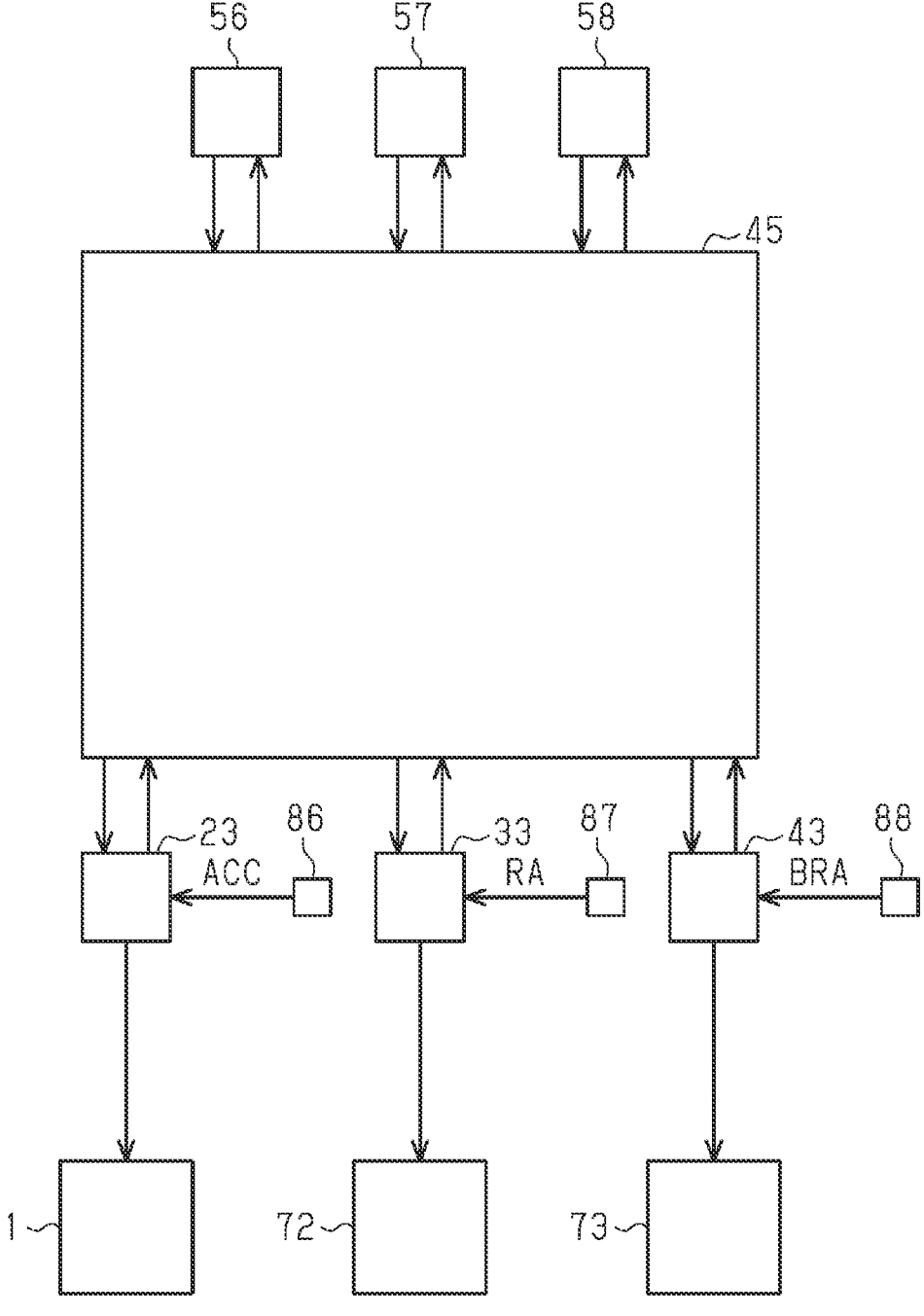
FIG. 2 is a functional block diagram illustrating a basic configuration of a motion manager.

As illustrated in FIG. 1, the information processing system IS includes a vehicle 100. The vehicle 100 includes a powertrain device 71, a steering system 72, and a brake device 73.

The powertrain device 71 includes an engine, a motor generator, a transmission, and so forth. The engine can impart driving force to drive wheels of the vehicle 100 via the transmission. The motor generator can also impart driving force to the drive wheels of the vehicle 100 via the transmission.

An example of the steering system 72 is a rack and pinion electric steering system. The steering system 72 can change orientation of steered wheels of the vehicle 100 by controlling a rack and a pinion that is omitted from illustration.

The brake device 73 is a so-called mechanical brake device that mechanically brakes wheels of the vehicle 100. In the present embodiment, an example of the brake device 73 is a disc brake.

As illustrated in FIG. 1, the vehicle 100 includes a central ECU 10, a powertrain ECU 20, a steering ECU 30, a brake ECU 40, and an advanced driver assistance ECU 50. The vehicle 100 also includes a first external bus 61, a second external bus 62, a third external bus 63, a fourth external bus 64, and a fifth external bus 65. Note that the term "ECU" is an abbreviation for "electronic control unit."

The central ECU 10 centrally controls the entire vehicle 100. The central ECU 10 includes an execution device 11 and a storage device 12. An example of the execution device 11 is a central processing unit (CPU). The storage device 12 includes read-only memory (ROM) that can only be read, volatile random-access memory (RAM) that can be read and written to, and non-volatile storage that can be read and written to. The storage device 12 stores various types of programs and various types of data in advance. The execution device 11 realizes various types of processing by executing the programs stored in the storage device 12. One or more processors may be used as the execution device 11. One or more memories may be used as the storage device 12.

The powertrain ECU 20 can communicate with the central ECU 10 via the first external bus 61. The powertrain ECU 20 controls the powertrain device 71 by outputting control signals to the powertrain device 71. The powertrain ECU 20 includes an execution device 21 and a storage device 22. An example of the execution device 21 is a CPU. The storage device 22 includes ROM, RAM, and storage. The storage device 22 stores various types of programs and various types of data in advance. The storage device 22 also stores a powertrain application 23A as one of the various types of programs in advance. The powertrain application 23A is application software for controlling the powertrain device 71. The execution device 21 realizes a function as a powertrain control unit 23, which will be described later, by executing the powertrain application 23A stored in the storage device 22.

The steering ECU 30 can communicate with the central ECU 10 via the second external bus 62. The steering ECU 30 controls the steering system 72 by outputting control signals to the steering system 72. The steering ECU 30 includes an execution device 31 and a storage device 32. An example of the execution device 31 is a CPU. The storage device 32 includes ROM, RAM, and storage. The storage device 32 stores various types of programs and various types of data in advance. The storage device 32 also stores a steering application 33A as one of the various types of programs in advance. The steering application 33A is application software for controlling the steering system 72. The execution device 31 realizes a function as a steering control unit 33, which will be described later, by executing the steering application 33A stored in the storage device 32.

The brake ECU 40 can communicate with the central ECU 10 via the third external bus 63. The brake ECU 40 controls the brake device 73 by outputting control signals to the brake device 73. The brake ECU 40 includes an execution device 41 and a storage device 42. An example of the execution device 41 is a CPU. The storage device 42 includes ROM, RAM, and storage. The storage device 42 stores various types of programs and various types of data in advance. The storage device 42 also stores a brake application 43A as one of the various types of programs in advance. The brake application 43A is application software for controlling the brake device 73. The storage device 42 further stores a motion manager application 45A as one of the various types of programs in advance. The motion manager application 45A is application software for arbitration of a plurality of motion requests. The execution device 41 realizes a function as a brake control unit 43, which will be described later, by executing the brake application 43A stored in the storage device 42. The execution device 41 also realizes a function as a motion manager 45, which will be described later, by executing the motion manager application 45A stored in the storage device 42. In the present embodiment, the brake ECU 40 is an example of an information processing device.

The advanced driver assistance ECU 50 can communicate with the central ECU 10 via the fourth external bus 64. The advanced driver assistance ECU 50 executes various types of driver assistance. The advanced driver assistance ECU 50 includes an execution device 51 and a storage device 52. An example of the execution device 51 is a CPU. The storage device 52 includes ROM, RAM, and storage. The storage device 52 stores various types of programs and various types of data in advance. The various types of programs include a first assistance application 56A, a second assistance application 57A, and a third assistance application 58A. An example of the first assistance application 56A is application software for collision damage mitigation braking that automatically applies braking to mitigate collision damage to the vehicle 100, that is, so-called autonomous emergency braking (AEB). An example of the second assistance application 57A is application software for so-called lane keeping assist (LKA) that keeps the vehicle 100 in the lane in which it is traveling. An example of the third assistance application 58A is application software for so-called adaptive cruise control (ACC) that allows the vehicle 100 to travel while maintaining a constant following distance from a preceding vehicle traveling ahead of the vehicle 100. In the present embodiment, the first assistance application 56A, the second assistance application 57A, and the third assistance application 58A are each application software that realizes driver assistance functions of the vehicle 100. The execution device 51 realizes a function as a first assistance unit 56, which will be described later, by executing the first assistance application 56A stored in the storage device 52. The execution device 51 also realizes a function as a second assistance unit 57, which will be described later, by executing the second assistance application 57A stored in the storage device 52. The execution device 51 also realizes a function as a third assistance unit 58, which will be described later, by executing the third assistance application 58A stored in the storage device 52.

As illustrated in FIG. 1, the vehicle 100 includes an acceleration sensor 81, a wheel speed sensor 82, and a GNSS receiver 83. The vehicle 100 also includes an accelerator operation amount sensor 86, a steering angle sensor 87, and a brake operation amount sensor 88.

The acceleration sensor 81 is a so-called triaxial sensor. That is to say, the acceleration sensor 81 can detect front-rear acceleration GX, right-left acceleration GY, and up-down acceleration GZ. The front-rear acceleration GX is an acceleration along a front-rear axis of the vehicle 100. The right-left acceleration GY is an acceleration along a right-left axis of the vehicle 100. The up-down acceleration GZ is acceleration along an up-down axis of the vehicle 100.

The wheel speed sensor 82 detects a wheel speed WS that is rotational speed of the wheels of the vehicle 100. The wheel speed sensor 82 is situated near each wheel of the vehicle 100. In the present embodiment, the vehicle 100 includes four wheel speed sensors 82 respectively corresponding to the four wheels that the vehicle 100 is equipped with. Note that just one wheel speed sensor 82 is representatively illustrated in FIG. 1.

The GNSS receiver 83 detects position coordinates PC, which are coordinates of the point at which the vehicle 100 is situated, through communication with GNSS satellites that are omitted from illustration. Note that the term "GNSS" is an abbreviation for "Global Navigation Satellite System."

The accelerator operation amount sensor 86 detects an accelerator operation amount ACC, which is an operation amount of an accelerator pedal operated by a driver. The steering angle sensor 87 detects a steering angle RA, which is an angular position of a steering wheel operated by the driver. The brake operation amount sensor 88 detects a brake operation amount BRA, which is an operation amount of a brake pedal operated by the driver.

The powertrain ECU 20 acquires signals indicating the accelerator operation amount ACC from the accelerator operation amount sensor 86. The steering ECU 30 acquires signals indicating the steering angle RA from the steering angle sensor 87. The brake ECU 40 acquires signals indicating the front-rear acceleration GX, the right-left acceleration GY, and the up-down acceleration GZ, from the acceleration sensor 81. The brake ECU 40 also acquires signals indicating the position coordinates PC from the GNSS receiver 83. The brake ECU 40 also acquires signals indicating four wheel speeds WS from the four wheel speed sensors 82. The brake ECU 40 acquires signals indicating the brake operation amount BRA from the brake operation amount sensor 88. Note that the brake ECU 40 can acquire various types of values, including the accelerator operation amount ACC and the steering angle RA, via the central ECU 10.

The brake ECU 40 calculates a vehicle speed SP, which is the speed of the vehicle 100, at every control cycle set in advance. For example, the brake ECU 40 calculates the vehicle speed SP by multiplying an average value of the four wheel speeds WS by a coefficient that is set in advance. That is to say, the brake ECU 40 can acquire the vehicle speed SP.

The brake ECU 40 also calculates, based on the front-rear acceleration GX, the right-left acceleration GY, and the up-down acceleration GZ, at each control cycle set in advance, a road surface gradient AR that is a gradient of the road surface at the point at which the vehicle 100 is situated.

As illustrated in FIG. 1, the vehicle 100 includes a DCM 91 and a display 92. The DCM 91 is connected to the central ECU 10 via the fifth external bus 65. The DCM 91 can wirelessly communicate with equipment outside the vehicle 100 via a communication network NW. Note that the term "DCM" is an abbreviation for "data communication module." The display 92 is connected to the central ECU 10. The display 92 can display various types of information based on image data output from the central ECU 10.

As illustrated in FIG. 1, the information processing system IS includes a server 200. The server 200 includes an execution unit 210, a storage unit 220, and a communication unit 230. The communication unit 230 can communicate with equipment outside the server 200 via the communication network NW. The storage unit 220 includes ROM, RAM, and storage. The storage unit 220 stores various types of programs and various types of data in advance. An example of the execution unit 210 is a CPU. The execution unit 210 realizes various types of processing by executing various types of programs stored in the storage unit 220. One or more processors may be used as the execution unit 210. One or more memories may be used as the storage unit 220.

Basic Configuration Related to Motion Manager

Next, a basic configuration related to the motion manager 45 will be described with reference to FIG. 2. As illustrated in FIG. 2, the motion manager 45 can mutually communicate with the first assistance unit 56, the second assistance unit 57, and the third assistance unit 58. The motion manager 45 can also mutually communicate with the powertrain control unit 23, the steering control unit 33, and the brake control unit 43.

The first assistance unit 56, the second assistance unit 57, and the third assistance unit 58 output motion requests to the motion manager 45 when executing various types of control. At this time, for example, the first assistance unit 56, the second assistance unit 57, and the third assistance unit 58 continuously output the motion requests from when the various types of control become necessary until such control is no longer necessary. The motion requests here include a requested front-rear acceleration GXR and so forth, for controlling the acceleration along the front-rear axis of the vehicle 100.

The motion manager 45 accepts requested front-rear accelerations GXR as the motion requests from the first assistance unit 56, the second assistance unit 57, and the third assistance unit 58. The motion manager 45 also arbitrates the requested front-rear accelerations GXR that are accepted. For example, when the motion manager 45 accepts the requested front-rear accelerations GXR from a plurality of assistance units, the motion manager 45 selects the requested front-rear acceleration GXR that is accepted at an earliest timing as an arbitration result. Alternatively, for example, when the motion manager 45 accepts the requested front-rear accelerations GXR from the assistance units, the motion manager 45 selects the smallest requested front-rear acceleration GXR as an arbitration result. The motion manager 45 thus arbitrates the motion requests according to a rule that is set in advance, based on driving conditions of the vehicle 100.

The motion manager 45 generates instruction signals for action requests to control various types of actuators based on the requested front-rear acceleration GXR selected as the arbitration result. The various types of actuators here include the powertrain device 71, the steering system 72, the brake device 73, and so forth. For example, when controlling the powertrain device 71, the motion manager 45 outputs an instruction signal for an action request to the powertrain control unit 23. The powertrain control unit 23 then outputs a control signal to the powertrain device 71 based on the instruction signal for the action request. In this way, the instruction signal output from the motion manager 45 is received by the control unit corresponding to the actuator to be controlled, and the actuator is controlled by the control unit.

Each of the powertrain control unit 23, the steering control unit 33, and the brake control unit 43, can receive an instruction signal for an action request from the driver of the vehicle 100, in addition to an instruction signal for an action request from the motion manager 45. When receiving the instruction signal for the action request from the driver of the vehicle 100, each of the powertrain control unit 23, the steering control unit 33, and the brake control unit 43 outputs a control signal to its corresponding actuator, based on the instruction signal for the action request from the driver of the vehicle 100. That is to say, when each control unit receives an instruction signal for an action request from the driver of the vehicle 100, each control unit disables an instruction signal for an action request from the motion manager 45. Note that the powertrain control unit 23 can receive the accelerator operation amount ACC from the accelerator operation amount sensor 86 as an instruction signal for an action request, for controlling the actuator based on operations of the driver. Also, the steering control unit 33 can receive the steering angle RA from the steering angle sensor 87 as an instruction signal for an action request to control the actuator based on operations of the driver. Further, the brake control unit 43 can receive the brake operation amount BRA from the brake operation amount sensor 88 as an instruction signal for an action request to control the actuator based on operations of the driver.

Collection Control

Next, collection control that is executed by the vehicle 100 and the server 200 will be described with reference to FIG. 3. This collection control is control for the server 200 to collect various types of values from the vehicle 100. The collection control is executed in parallel between each of a plurality of the vehicles 100 and the single server 200. In the present embodiment, the motion manager 45 of the vehicle 100 executes the collection control at every control cycle set in advance.

Figure 3:
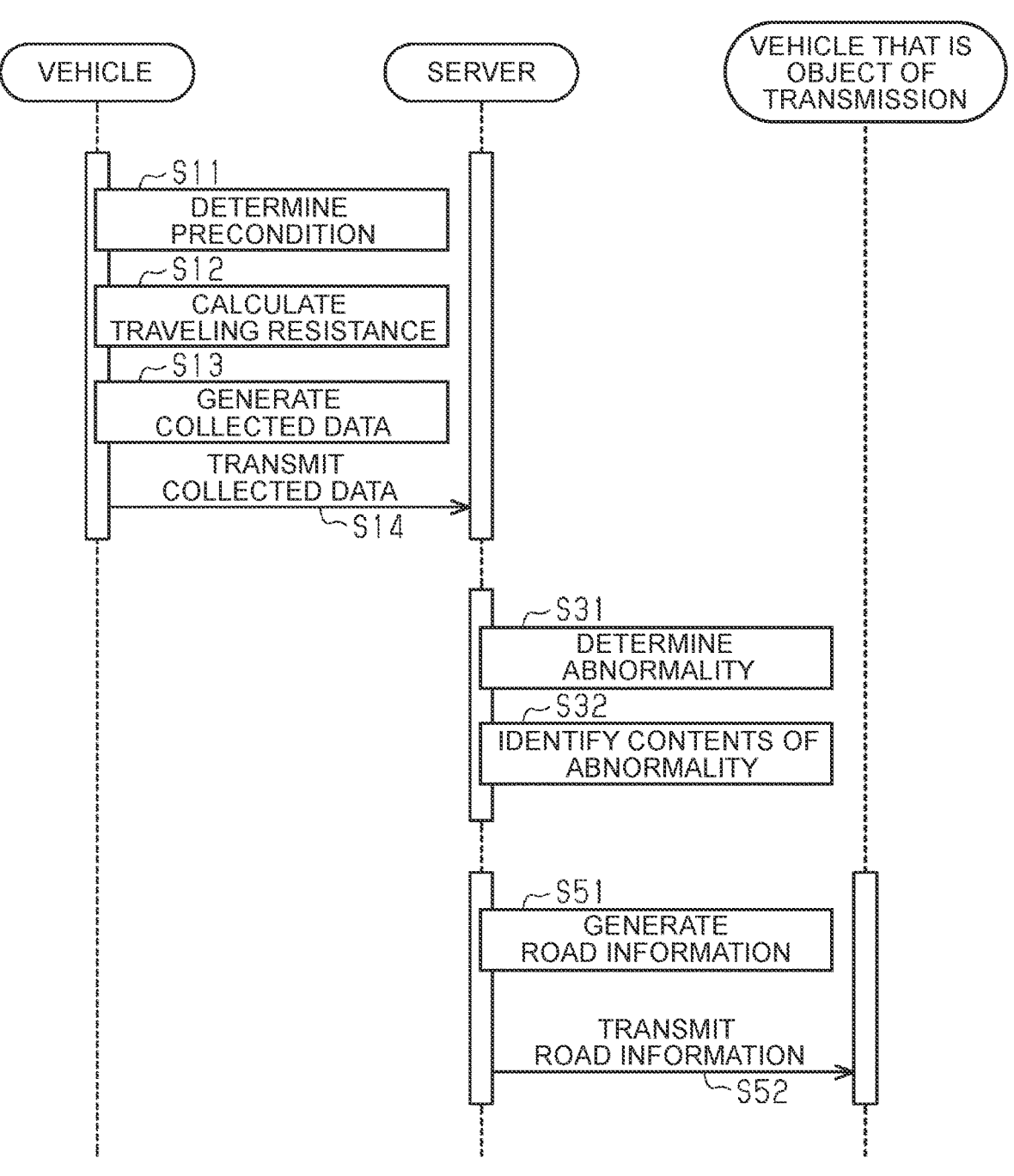
FIG. 3 is a sequence diagram showing collection control, determination control, and distribution control.

As shown in FIG. 3, when the collection control is started, the motion manager 45 of the vehicle 100 executes the processing of step S11. In step S11, the motion manager 45 determines whether a precondition that is set in advance is satisfied. Here, an example of the precondition is a condition that various types of sensors are normal, and various types of ECUs are normal. Note that known techniques may be used to determine whether the sensors are normal and to determine whether the ECUs are normal. When the motion manager 45 determines in step S11 that the precondition is not satisfied, the motion manager 45 ends the current collection control. On the other hand, when the motion manager 45 determines in step S11 that the precondition is satisfied, the motion manager 45 advances the processing to step S12.

In step S12, the motion manager 45 calculates traveling resistance RR based on vehicle driving force FV, inertial resistance RI, and gradient resistance RG. Note that, as a premise, when the vehicle 100 travels, a relation in the following Expression (1) is satisfied. The following Expression (2) can be derived by converting Expression (1).

$$\text{vehicle driving force } FV = \text{inertial resistance } RI + \text{gradient resistance } RG + \text{traveling resistance } RR \quad \text{Expression (1):}$$

$$\text{traveling resistance } RR = \text{vehicle driving force } FV - \text{inertial resistance } RI - \text{gradient resistance } RG \quad \text{Expression (2):}$$

Here, the vehicle driving force FV is driving force of vehicle 100. Accordingly, for example, the motion manager 45 can acquire the vehicle driving force FV based on torque of the engine and the motor generator, gear ratio of the transmission and so forth, and the radius of the drive wheels of the vehicle 100. In the present embodiment, the vehicle driving force FV is expressed in units of "N (newtons)".

Here, the inertial resistance RI is an apparent resistance force with respect to motion of the vehicle 100. Thus, for example, the motion manager 45 can acquire the inertial resistance RI based on the acceleration along the front-rear axis of the vehicle 100 and total weight of the vehicle 100. In the present embodiment, the inertial resistance RI is expressed in units of "N (newtons)".

The gradient resistance RG is resistance force due to the gradient at the point at which the vehicle 100 is situated. Accordingly, for example, the motion manager 45 can acquire the gradient resistance RG based on the road surface gradient AR, gravitational acceleration, and the total weight of the vehicle 100. Note that, for example, when the vehicle 100 is situated on an uphill incline, the gradient resistance RG is a positive value. In contrast, for example, when the vehicle 100 is situated on a downhill incline, the gradient resistance RG is a negative value. In the present embodiment, the gradient resistance RG is expressed in units of "N (newtons)".

Further, the traveling resistance RR is resistance forces including wind resistance, rolling resistance, drag, and so forth, due to the vehicle 100 traveling. As shown in Expression (2) above, the traveling resistance RR is a value obtained by subtracting the inertial resistance RI and the gradient resistance RG from the vehicle driving force FV. In the present embodiment, the traveling resistance RR is expressed in units of "N (newtons)".

The motion manager 45 calculates the traveling resistance RR by substituting the vehicle driving force FV, the inertial resistance RI, and the gradient resistance RG into Expression (2). After step S12, the motion manager 45 advances the processing to step S13.

In step S13, the motion manager 45 generates collected data DC. In the present embodiment, the motion manager 45 generates data including position coordinates PC, the traveling resistance RR, vehicle speed SP, the steering angle RA, and so forth, as the collected data DC. Here, the traveling resistance RR, the vehicle speed SP, and the steering angle RA, which are included in the collected data DC, correspond to the position coordinates PC included in the collected data DC. That is to say, the traveling resistance RR included in the collected data DC is calculated based on the vehicle driving force FV at the position coordinates PC included in the collected data DC, the inertial resistance RI at these position coordinates PC, and the gradient resistance RG at these position coordinates PC. Similarly, the vehicle speed SP included in the collected data DC is the vehicle speed SP at the position coordinates PC included in the collected data DC. The steering angle RA included in the collected data DC is the steering angle RA at the position coordinates PC included in the collected data DC. After step S13, the motion manager 45 advances the processing to step S14.

In step S14, the motion manager 45 of the vehicle 100 sends the collected data DC to the server 200. As a result, the execution unit 210 of the server 200 acquires the collected data DC. At this time, the execution unit 210 of the server 200 stores the collected data DC that is acquired in the storage unit 220. Note that the execution unit 210 of the server 200 can acquire history of the collected data DC transmitted from each vehicle 100, by the collection control being repeatedly executed. After step S14, the execution unit 210 of the server 200 ends the current collection control.

Determination Control

Next, determination control that is executed by the server 200 will be described with reference to FIG. 3. This determination control is control for determining abnormality of the road. In the present embodiment, the execution unit 210 of the server 200 executes the determination control each time the collected data DC is acquired in the collection control described above. At this time, the execution unit 210 of the server 200 executes the determination control using the collected data DC for each vehicle 100 that has transmitted the collected data DC.

As shown in FIG. 3, when the determination control is started, the execution unit 210 of the server 200 executes the processing of step S31. In step S31, the execution unit 210 of the server 200 determines whether there is an abnormality on the road at the position coordinates PC included in the collected data DC, based on the traveling resistance RR included in the collected data DC. Specifically, the execution unit 210 of the server 200 identifies the traveling resistance RR included in the newest collected data DC. The execution unit 210 also identifies the traveling resistance RR included in the collected data DC that is collected from the same vehicle 100 and that was acquired a predetermined period before an acquisition point in time of the newest collected data DC. The execution unit 210 then calculates a value obtained by subtracting the traveling resistance RR from a predetermined period of time ago, from the newest traveling resistance RR as an amount of increase in the traveling resistance RR. Note that an example of the predetermined period is several tenths of a second to several seconds or so. The execution unit 210 of the server 200 then determines whether the amount of increase in the traveling resistance RR is no less than a stipulated resistance value A that is set in advance. For example, when the vehicle 100 passes through point at which an abnormality is occurring, such as a point that is flooded, a point at which a sidewind is blowing, or the like, the traveling resistance RR calculated for the vehicle 100 tends to increase. Accordingly, the stipulated resistance value A is set in advance, as a first threshold value for determining presence of an abnormality on the road, through experiments, simulations, and so forth. Then, when the amount of increase in the traveling resistance RR is less than the stipulated resistance value A, the execution unit 210 of the server 200 determines that there is no abnormality occurring on the road at the position coordinates PC included in the newest collected data DC. In this way, in step S31, when the execution unit 210 of the server 200 determines that there is no abnormality on the road, the execution unit 210 of the server 200 ends the current determination control. Conversely, when the amount of increase in the traveling resistance RR is no less than the stipulated resistance value A, the execution unit 210 of the server 200 determines that there is an abnormality occurring on the road at the position coordinates PC included in the newest collected data DC. In this way, in step S31, when the execution unit 210 of the server 200 determines that there is an abnormality on the road, the execution unit 210 of the server 200 advances the processing to step S32.

In step S32, the execution unit 210 of the server 200 identifies, based on the newest collected data DC, contents of the road abnormality at the position coordinates PC included in the collected data DC. Specifically, in step S32, the execution unit 210 of the server 200 determines whether a first abnormality condition that is set in advance is satisfied. Now, the execution unit 210 of the server 200 determines that the first abnormality condition is satisfied when all of the following requirement (1) and requirement (2) are satisfied.

Requirement (1): That the amount of increase in the traveling resistance RR included in the collected data DC is no less than the stipulated resistance value A that is set in advance.

Now, the amount of increase in traveling resistance RR in requirement (1) is the same as the amount of increase in traveling resistance RR used in step S31 above. The stipulated resistance value A of requirement (1) is the same as the stipulated resistance value A used in step S31 above.

Requirement (2): That the vehicle speed SP included in the collected data DC is no greater than a stipulated vehicle speed B that is set in advance.

Now, the collected data DC of requirement (2) is the same as the collected data DC of requirement (1). The stipulated vehicle speed B is set in advance through experiments, simulations, and so forth, as a second threshold value for determining that flooding has occurred, as a road abnormality.

When the collected data DC satisfies the first abnormality condition, the execution unit 210 of the server 200 determines that there is a road abnormality at the position coordinates PC included in the collected data DC, and identifies that the type of the abnormality is flooding. In other words, the execution unit 210 of the server 200 identifies that flooding is occurring as a road abnormality at the position coordinates PC included in the collected data DC, under the condition that the amount of increase in traveling resistance RR included in the collected data DC is no less than the stipulated resistance value A, and also that the vehicle speed SP included in the collected data DC is no greater than the stipulated vehicle speed B.

In step S32, the execution unit 210 of the server 200 determines whether a second abnormality condition that is set in advance is satisfied. Now, the execution unit 210 of the server 200 determines that the second abnormality condition is satisfied when the above requirement (1), and the following requirement (3) and requirement (4), are all satisfied.

Requirement (3): That the vehicle speed SP included in the collected data DC is greater than the stipulated vehicle speed B that is set in advance.

Now, the collected data DC of requirement (3) is the same as the collected data DC of requirement (1). The stipulated vehicle speed B of requirement (3) is the same as the stipulated vehicle speed B of requirement (2) above.

Requirement (4): An amount of variation in the steering angle RA included in the collected data DC is no less than a stipulated steering angle C that is set in advance.

Now, the collected data DC of requirement (4) is the same as the collected data DC of requirement (1). The execution unit 210 of the server 200 identifies the steering angle RA included in the newest collected data DC. The execution unit 210 also identifies the steering angle RA included in the collected data DC that is collected from the same vehicle 100 and that was acquired a predetermined period before the acquisition point in time of the newest collected data DC. The execution unit 210 then calculates an absolute value of a value obtained by subtracting the steering angle RA at a predetermined period ago from the newest steering angle RA, as the amount of variation in the steering angle RA. Note that the stipulated steering angle C is set in advance through experiments, simulations, and so forth, as a third threshold value for determining that a sidewind is blowing, as a road abnormality.

When the collected data DC satisfies the second abnormality condition, the execution unit 210 of the server 200 determines that there is a road abnormality at the position coordinates PC included in the collected data DC, and identifies that the type of the abnormality is sidewind. In other words, the execution unit 210 of the server 200 identifies that a sidewind is blowing as a road abnormality at the position coordinates PC included in the collected data DC, under the condition that the amount of increase in the traveling resistance RR included in the collected data DC is no less than the stipulated resistance value A, the vehicle speed SP included in the collected data DC is greater than the stipulated vehicle speed B, and also the amount of variation in the steering angle RA included in the collected data DC is no less than the stipulated steering angle C.

The execution unit 210 of the server 200 determines that the contents of the abnormality are unknown when the collected data DC does not satisfy either the first abnormality condition or the second abnormality condition. At this time, the execution unit 210 may determine that there is no abnormality on the road at the position coordinates PC. After step S32, the execution unit 210 of the server 200 ends the current determination control.

Distribution Control

Next, distribution control that is executed by the vehicle 100 and the server 200 will be described with reference to FIG. 3. This distribution control is control for transmitting road information IR from the server 200 to the vehicle 100. The distribution control is executed in parallel between each of the vehicles 100 and the single server 200. In the present embodiment, the execution unit 210 of the server 200 executes the distribution control on the condition that determination has been made by the determination control that there is a new road abnormality.

As shown in FIG. 3, when the distribution control is started, the execution unit 210 of the server 200 executes the processing of step S51. In step S51, the execution unit 210 of the server 200 generates the road information IR. In the present embodiment, the execution unit 210 of the server 200 generates, as road information IR, information including a combination of the position coordinates PC at which an abnormality is determined in step S31 to be present on the road, and the contents of the road abnormality identified in step S32. After step S51, the execution unit 210 of the server 200 advances the processing to step S52.

In step S52, the execution unit 210 of the server 200 transmits the road information IR to the vehicle 100. In the present embodiment, an example of the vehicle 100 that is an object of transmission of the road information IR is a vehicle 100 situated within a stipulated distance that is set in advance from the position coordinates PC included in the road information IR. The stipulated distance is, for example, around several kilometers to several tens of kilometers. As a result, the motion manager 45 of the vehicle 100 acquires the road information IR. At this time, the motion manager 45 of the vehicle 100 notifies the driver of the vehicle 100 of the road information IR by outputting a control signal to the display 92 via the central ECU 10. After step S52, the motion manager 45 ends the current distribution control.

Operations of Present Embodiment

When the vehicle 100 passes through a point at which flooding is occurring as a road abnormality, for example, resistance accompanying the traveling of the vehicle 100, i.e., the traveling resistance RR, increases. Further, for example, when the vehicle 100 passes through a point at which a sidewind is blowing as a road abnormality as well, the traveling resistance RR increases due to the disturbance of the air flow around the vehicle 100 from the sidewind, and so forth. As described in Expression (1) above, when the vehicle 100 is traveling, the vehicle driving force FV matches the sum of the inertial resistance RI, the gradient resistance RG, and the traveling resistance RR. Accordingly, the traveling resistance RR can be calculated based on the vehicle driving force FV, the inertial resistance RI, and the gradient resistance RG. Thus, in step S12 of the collection control, the motion manager 45 calculates the traveling resistance RR by substituting the vehicle driving force FV, the inertial resistance RI, and the gradient resistance RG into the above Expression (2). Also, in step S13 of the collection control, the motion manager 45 generates data including the position coordinates PC, the traveling resistance RR, the vehicle speed SP, the steering angle RA, and so forth, as the collected data DC. Further, in step S14 of the collection control, the motion manager 45 of the vehicle 100 transmits the collected data DC to the server 200.

Effects of Present Embodiment (1) According to the present embodiment, the collected data DC including the position coordinates PC and traveling resistance RR is transmitted to the server 200 in the collection control, and accordingly the execution unit 210 of the server 200 can obtain the collected data DC. That is to say, the execution unit 210 of the server 200 can obtain data for determining or estimating road abnormalities such as flooding and so forth.

(2) When the vehicle 100 is about to pass a point at which flooding is occurring as a road abnormality, for example, it is likely that the vehicle speed SP will decrease before the vehicle 100 reaches the point at which flooding is occurring, due to the driver of the vehicle 100 performing an operation or the like. Accordingly, generally, when the vehicle 100 passes through a flooded point, the vehicle speed SP of the vehicle 100 tends to be low.

In the present embodiment, the collected data DC includes the vehicle speed SP at the position coordinates PC in addition to the position coordinates PC and the traveling resistance RR. Thereby, the execution unit 210 of the server 200 can obtain data for identifying that flooding is occurring as a road abnormality.

(3) For example, assumption will be made that a sidewind is blowing as an abnormality on the road. At this time, when the vehicle 100 is subjected to a sidewind, it is likely that the steering angle RA operated by the driver of the vehicle 100 will change under the influence of the sidewind.

In the present embodiment, the collected data DC includes the steering angle RA at the position coordinates PC, in addition to the position coordinates PC and the traveling resistance RR. Thus, the execution unit 210 of the server 200 can obtain data for identifying that a sidewind is blowing as a road abnormality.

(4) In step S31 of the determination control, the execution unit 210 of the server 200 determines whether there is an abnormality on the road at the position coordinates PC included in the collected data DC, based on the traveling resistance RR included in the collected data DC. Thus, whether there is an abnormality on the road at the position coordinates PC included in the collected data DC can be comprehended.

(5) As described above, generally, when the vehicle 100 passes through a flooded point, the vehicle speed SP of the vehicle 100 tends to be low. With respect to this point, in step S32 of the determination control, the execution unit 210 of the server 200 determines that there is an abnormality on the road at the position coordinates PC included in the collected data DC, and the type of the abnormality is identified as being flooding, on the condition that the amount of increase in the traveling resistance RR included in the collected data DC is no less than the stipulated resistance value A, and also that the vehicle speed SP included in the collected data DC is no higher than the stipulated vehicle speed B. Thus, the execution unit 210 of the server 200 can identify that flooding is occurring as a road abnormality by taking into account the vehicle speed SP included in the collected data DC.

(6) As described above, when the vehicle 100 is subjected to a sidewind, it is likely that the steering angle RA operated by the driver of the vehicle 100 will change under the influence of the sidewind. With respect to this point, in step S32 of the determination control, the execution unit 210 of the server 200 determines that there is an abnormality on the road at the position coordinates PC included in the collected data DC, and identifies the type of the abnormality to be a sidewind, under the condition that the amount of increase in traveling resistance RR included in the collected data DC is no less than the stipulated resistance value A, the vehicle speed SP included in the collected data DC is higher than the stipulated vehicle speed B, and also the amount of variation in the steering angle RA included in the collected data DC is no smaller than the stipulated steering angle C. Accordingly, the execution unit 210 of the server 200 can identify that a sidewind is blowing as a road abnormality by taking into account the steering angle RA included in the collected data DC. Moreover, in a situation in which the vehicle speed SP is relatively high, that is to say, in a situation in which the influence of the sidewind is likely to be great, identification can be made that the sidewind is blowing as a road abnormality.

Modifications

The present embodiment can be carried out modified as follows. The present embodiment and the following modifications can be mutually combined and carried out as long as no technical contradiction arises.

In the above embodiment, the collection control may be modified. For example, in step S12, the traveling resistance RR is not limited to being expressed in units of "N (newtons)". As a specific example, the unit of the traveling resistance RR may be "m/(s×s)".

For example, in the collection control, the motion manager 45 may execute the processing of step S31 and step S32. As a specific example, the motion manager 45 may execute the processing of step S31 and step S32, after step S12 and before step S13.

For example, in step S13, the motion manager 45 may generate data including not only the position coordinates PC, the traveling resistance RR, the vehicle speed SP, and the steering angle RA, but also other values, as the collected data DC. As a specific example, the collected data DC may include various types of values such as wheel speed WS, image data shot by a camera that the vehicle 100 is equipped with, and so forth. Further, as a specific example, when the motion manager 45 executes the processing of step S31 and step S32 in the collection control as described above, the collected data DC may include the determination results in the processing of step S31 and step S32.

In the above embodiment, the determination control may be changed. For example, in step S32, abnormalities of contents other than flooding and sidewind may be identified as road abnormalities. As a specific example, the execution unit 210 of the server 200 may determine whether a third abnormality condition that is set in advance is satisfied, in order to identify that a road abnormality is that snow can cause vehicles to become stuck on the road. Now, the execution unit 210 of the server 200 determines that the third abnormality condition is satisfied when the above requirement (1), and the following requirement (5), are all satisfied.

Requirement (5): That an absolute value of difference between a maximum value and a minimum value of the four wheel speeds WS included in the collected data DC is no less than a stipulated difference D that is set in advance. For example, in a situation in which it is snowing and there also is a possibility that the vehicle 100 may become stranded due to the snowfall, the execution unit 210 of the server 200 determines that the third abnormality condition is satisfied. When the collected data DC satisfies the third abnormality condition, the execution unit 210 of the server 200 determines that a road abnormality exists or may occur at the position coordinates PC included in the collected data DC, and identify the type of the abnormality as being stuck due to snow. The stipulated difference D is set in advance as a fourth threshold value, for determining road abnormality, through experiments, simulations, and the like.

In the above embodiment, the configuration of the information processing system IS may be changed.

For example, the ECU that realizes the function of the motion manager 45 may be other than the brake ECU 40. As a specific example, instead of the brake ECU 40, the execution device 11 of the central ECU 10 may realize the function of the motion manager 45 by executing the motion manager application 45A stored in the storage device 12. That is to say, the central ECU 10, the powertrain ECU 20, the steering ECU 30, the brake ECU 40, and the advanced driver assistance ECU 50, may be employed as information processing devices.

What is claimed is:

1. An information processing system, comprising:

one or more processors installed in a vehicle; and a server configured to perform wireless communication with the one or more processors, wherein the one or more processors are configured to execute:

acquiring vehicle driving force that is driving force of the vehicle;

acquiring inertial resistance that is an apparent resistance force with respect to motion of the vehicle;

acquiring position coordinates of a point at which the vehicle is situated;

acquiring gradient resistance that is a resistance force due to a gradient at the point at which the vehicle is situated;

calculating traveling resistance that is a value obtained by subtracting the inertial resistance and the gradient resistance from the vehicle driving force; and externally transmitting, from the vehicle, data including the position coordinates, and the traveling resistance calculated based on the vehicle driving force at the position coordinates, the inertial resistance at the position coordinates, and the gradient resistance at the position coordinates, as collected data; and the server is configured to execute:

acquiring the collected data;

determining whether an abnormality is present on a road at the position coordinates included in the collected data, based on the traveling resistance included in the collected data; and wherein the one or more processors of the vehicle are configured to further execute:

acquiring a vehicle speed of the vehicle; and acquiring a rotational speed of each of a plurality of wheels that the vehicle is equipped with;

wherein the collected data includes the vehicle speed at the position coordinates and the rotational speed of each of the wheels at the position coordinates, and the server is configured to further execute:

identifying that the abnormality is present on the road at the position coordinates included in the collected data, and that a type of the abnormality is becoming stuck due to snow, under a condition that an amount of increase in the traveling resistance included in the collected data is no less than a stipulated resistance value, and also an absolute value of difference between a maximum value and a minimum value of the rotational speed of each wheel included in the collected data is no less than a stipulated difference, acquiring position coordinates of a point at which another vehicle is situated, and determining whether the another vehicle is within a preset distance from the vehicle, and in response to determining that the another vehicle is within the preset distance from the vehicle, generating road information indicating that the abnormality is present on the road and transmitting the road information to the another vehicle, wherein another set of one or more processors of the another vehicle are configured to display the road information on a display.

2. The information processing system according to claim 1, wherein the one or more processors are configured to further execute:

acquiring a steering angle that is an angular position of a steering wheel of the vehicle;

the collected data includes the vehicle speed at the position coordinates and the steering angle at the position coordinates, and the server is configured to execute identifying that the abnormality is present on the road at the position coordinates included in the collected data, and that a type of the abnormality is flooding, under a condition that an amount of increase in the traveling resistance included in the collected data is no less than a stipulated resistance value, and also the vehicle speed included in the collected data is no higher than a stipulated vehicle speed.

3. The information processing system according to claim 1, wherein the one or more processors are configured to further execute:

acquiring a steering angle that represents an angular position of a steering wheel of the vehicle;

the collected data includes the vehicle speed at the position coordinates and the steering angle at the position coordinates, and the server is configured to execute identifying that the abnormality is present on the road at the position coordinates included in the collected data, and that a type of the abnormality is sidewind, under a condition that an amount of increase in the traveling resistance included in the collected data is no less than a stipulated resistance value, the vehicle speed included in the collected data is higher than a stipulated vehicle speed, and also an amount of variation in the steering angle that is included in the collected data is no less than a stipulated steering angle.

4. The information processing system according to claim 1, wherein the server is configured to further execute distributing road information including position coordinates at which determination is made that the abnormality is present on the road, to one or more of the vehicles, under a condition that determination is made that the abnormality is present on the road.

5. The information processing system according to claim 4, wherein the road information is distributed to vehicles situated within a stipulated distance from the position coordinates included in the road information.

* * * * *